May 24, 1966 L. P. FRIEDER 3,252,676
RIBLESS RIBBON PARACHUTE
Filed Dec. 3, 1963 3 Sheets-Sheet 1

INVENTOR.
LEONARD P. FRIEDER
BY Lester W. Clark
ATTORNEY

May 24, 1966   L. P. FRIEDER   3,252,676
RIBLESS RIBBON PARACHUTE
Filed Dec. 3, 1963   3 Sheets-Sheet 2
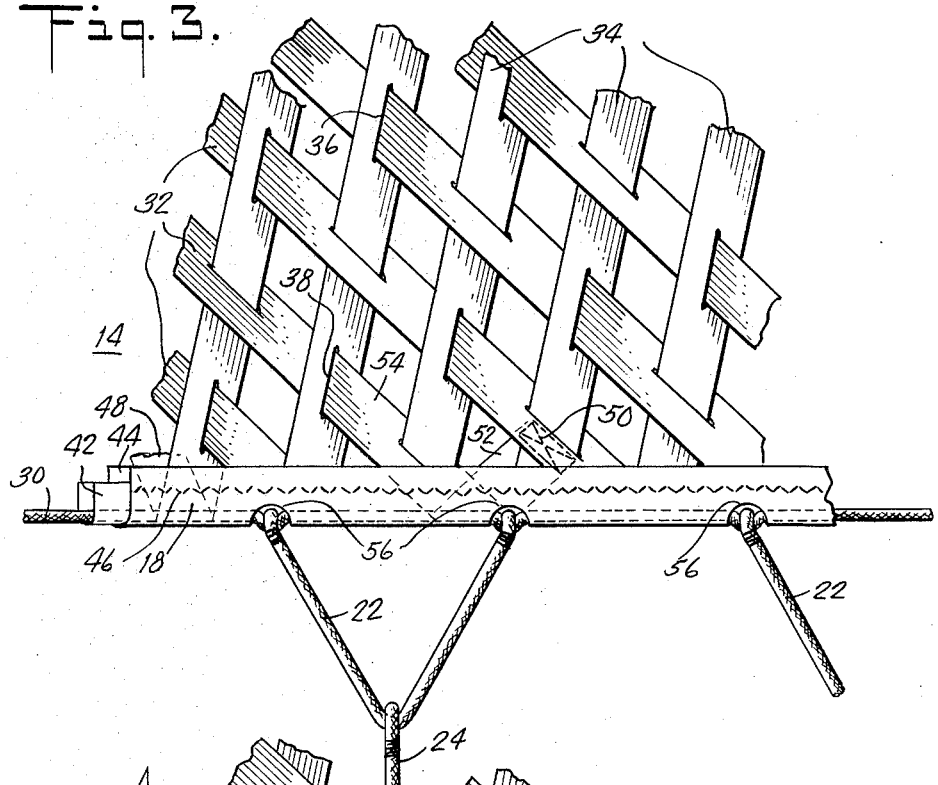
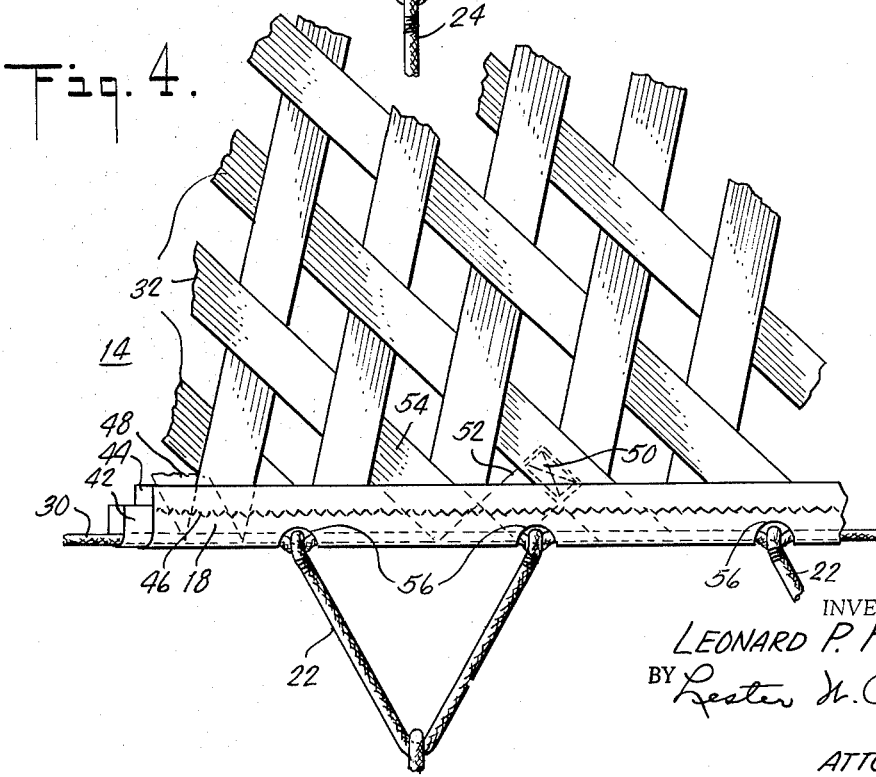
INVENTOR.
LEONARD P. FRIEDER
BY Lester H. Clark
ATTORNEY

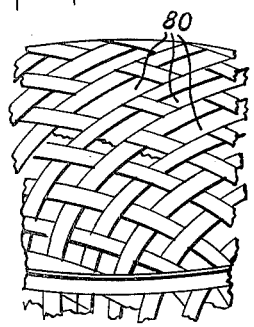
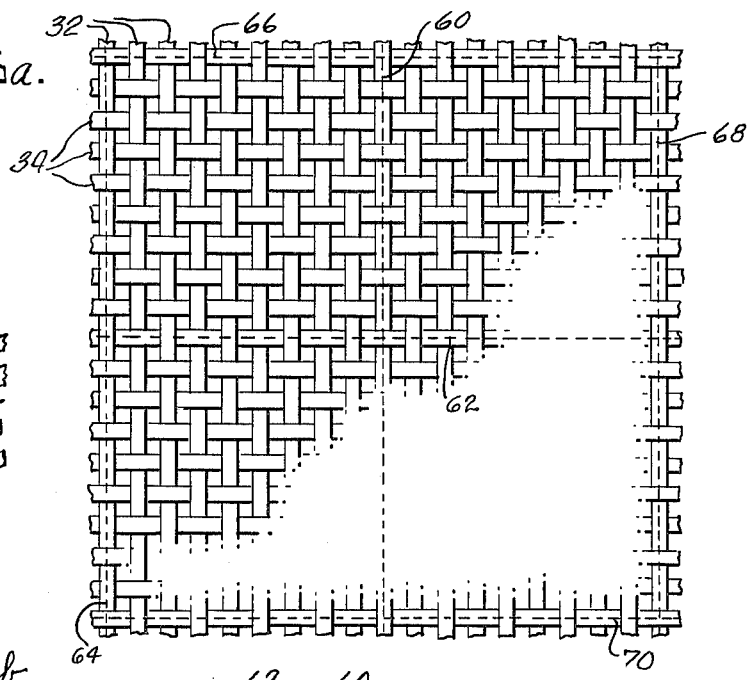
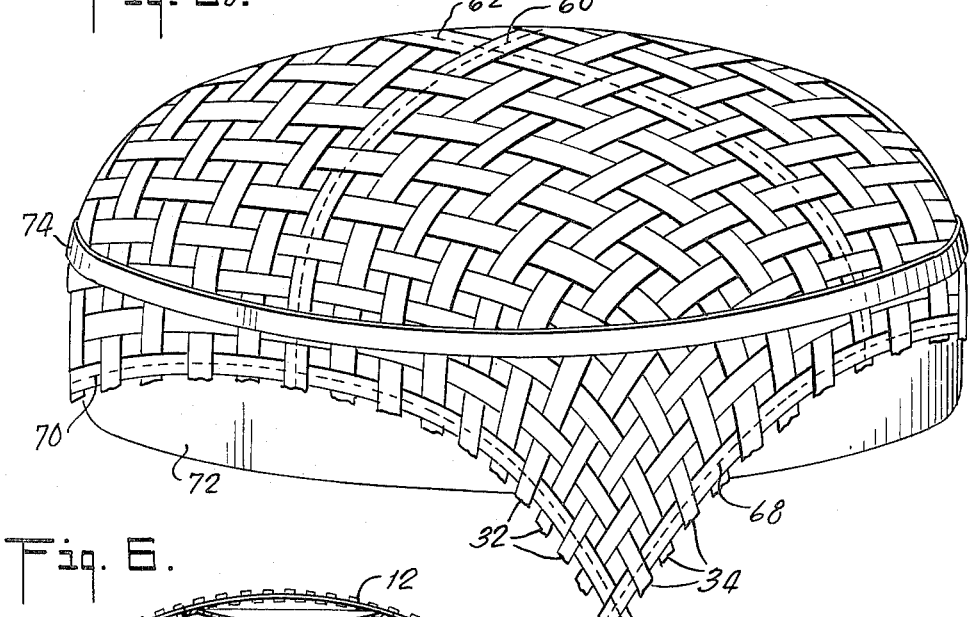
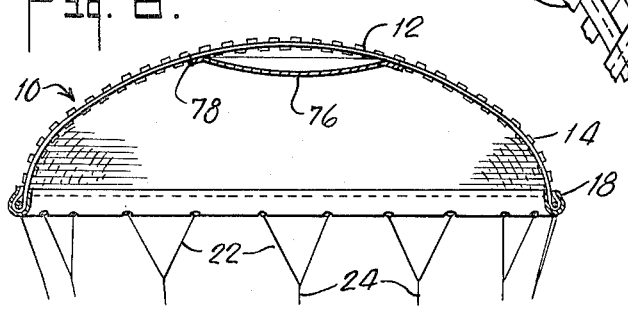

United States Patent Office 3,252,676
Patented May 24, 1966

3,252,676
RIBLESS RIBBON PARACHUTE
Leonard P. Frieder, 145 Station Road, Kings Point,
Great Neck, N.Y.
Filed Dec. 3, 1963, Ser. No. 327,747
15 Claims. (Cl. 244—145)

This invention relates to parachute structures and methods for the production thereof, and more particularly to parachute structures employing a canopy of the ribbon type.

Ribbon parachutes have been demonstrated to be extremely useful particularly for drops from modern high speed aircraft where the initial speed of the dropped object is very high in relation to the speeds encountered during opening of parachutes in the past. Generally the ribbons of these parachutes are arranged such that some of the adjacent ribbons are spaced apart. This permits the escape of air to relieve some of the pressure which would otherwise be destructive especially during high stress periods such as during initial opening.

Ribbon parachutes of the prior art have employed reenforcing members, either in the form of circular reenforcement bands which surround the canopy at various latitudes, or in the form of radial ribs or cords. The introduction and reliance upon these reenforcing members is disadvantageous because it involves additional expense in construction. Furthermore, such reenforcing members act as stress concentrators, with the result that the concentrated stresses are transferred to the immediately adjacent portions of the ribbons, with an increased likelihood of failure of those ribbon portions. It has now been discovered that a ribbon parachute structure, either as a complete canopy or as a zone of a canopy, has better stress distribution and is less likely to fail if it is constructed solely of ribbons, without reenforcing bands or ribs.

Accordingly, it is an object of the preesnt invention to provide an improved ribbon parachute structure without reenforcement members.

It is another object of the present invention to provide an improved ribbon parachute in which the complete canopy is without reenforcement members.

Another object of the invention is to provide an improved ribbon parachute structure in which a complete zone of the canopy is without reenforcement structures.

Flat parachute canopies are generally provided with reenforcement members as mentioned above because of the non-uniform stresses which are encountered during inflation of the parachute structure in use. Having been formed and assembled in a shape which is flat when unstressed, such parachutes are distorted by inflation, and it has been common to reenforce the distorted portions.

It is another object of the present invention to provide an improved ribbon parachute structure in which the parachute canopy may be formed in the flat, as a flat structure, and which is formed without reenforcing members such as ribs or bands.

It is frequently the practice in ribbon parachutes to provide a relatively large central vent opening in the canopy to impart aerodynamic stability to the structure, and to provide further relief of entrapped air to reduce stresses. However, this large unitary central opening presents a number of serious disadvantages. For one, it makes the parachute more sluggish and less positive in the opening operation. For another, it presents a structural inefficiency because the central opening is really a "spoiler" which provides a very substantial leak of air in the most important portion of the canopy and which thereby substantially reduces the effectiveness of the parachute.

Accordingly, it is one object of the invention to provide a stable ribbon parachute which does not require a central "spoiler" opening.

Another object of the invention is to provide a ribbon parachute which is more efficient in operation.

Another object of the present invention is to provide a ribbon parachute which is more reliable and positive in the opening operation.

It is another object of this invention to provide an improved ribbon parachute which will open dependably at a moderate rate so that the retarding forces will be gradually applied to the load.

It is another object of the present invention to provide a new and improved ribbon parachute which is adequately and sufficiently vented during periods of extremely high stress and which provides a more uniform retarding force under different load conditions within the normal stress range.

In extremely high altitude operations, where parachutes may be used for retarding space capsules during re-entry in the atmosphere, for instance, initial operation is at extremely high air velocity in the presence of very rarified air. In these circumstances, the parachute should be capable of providing a reasonable retarding force while in the rarified upper air, and while operating at high air velocity, and with a progressively increasing retarding force as the descent continues into less rarified air. All of this should be accomplished, of course, without damage to the parachute.

Accordingly, it is another object of this invention to provide a parachute structure which is particularly well adapted for operation beginning at extremely high altitudes such as are encountered upon the re-entry of space capsules.

It is another object of this invention to provide an improved method for the construction of ribbon parachutes which has the advantages of simplicity and economy.

The objects and advantages of this invention may be achieved in one preferred embodiment thereof by the provision of a parachute structure having a canopy comprised of at least two sets of criss-crossed fabric ribbons. These ribbons are uniformly spaced to define openings therebetween in the crown portion of the canopy. The members of each set of ribbons converge to a closer spacing in the skirt portions of the canopy, but are nevertheless spaced apart through their length.

Other objects and advantages of the invention will be apparent from the following description and the accompanying drawings which are as follows:

FIGURE 3 is a further enlarged detail view illustrating a preferred construction for interconnecting the intersecting ribbons in the parachute canopy structure of the present invention and also illustrating the preferred hem and shroud line construction.

FIGURE 4 is a detail view similar to that of FIGURE 3, but showing an alternative arrangement for interconnecting the ribbons at their intersections.

FIGURES 5a and 5b illustrate two of the steps in a preferred method of producing a ribbon parachute in accordance with the present invention.

FIGURE 6 is a side view through a central section of a modified embodiment of the parachute of the present invention which incorporates a solid panel in the center of the crown portion thereof.

FIGURE 7 is a perspective view of the crown portion of a ribbon parachute canopy showing a modified embodiment of the parachute of the present invention which incorporates additional ribbons at the middle of the crown portion.

Figure 1:
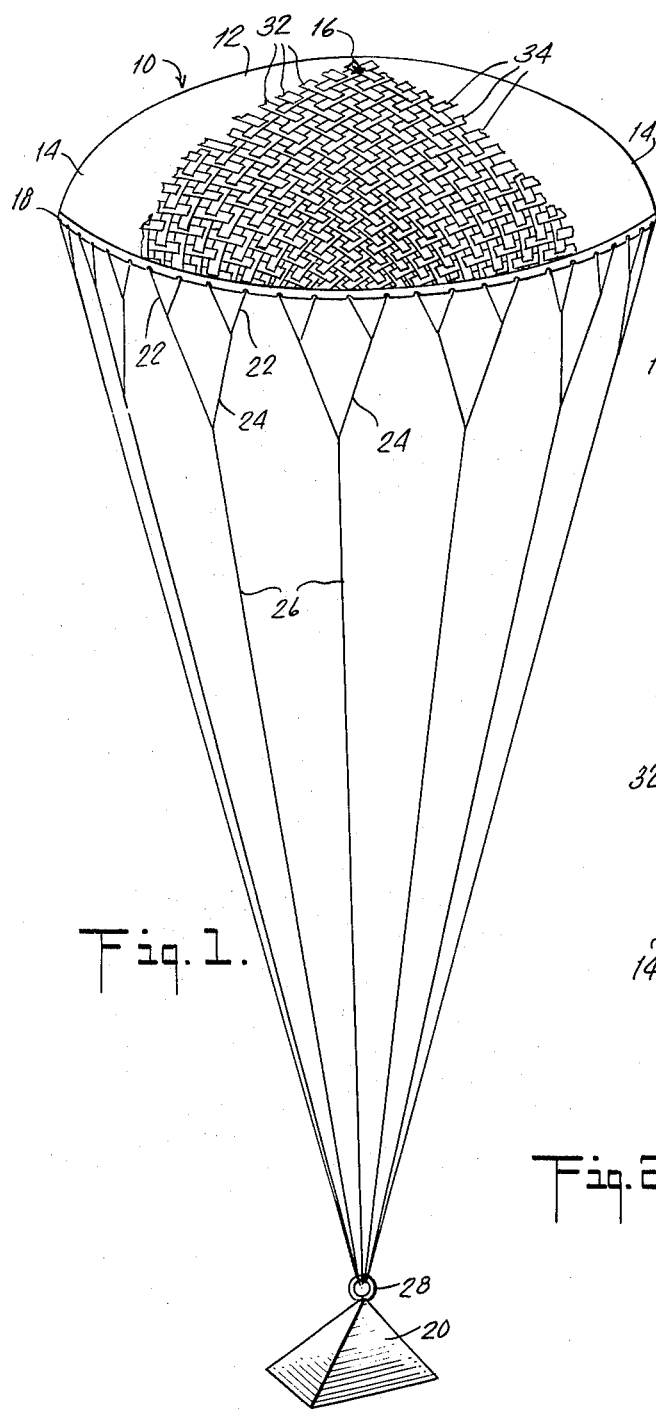
FIGURE 1 is an idealized perspective view of a preferred embodiment of the parachute of the present invention in the inflated state.

FIGURE 1 illustrates a preferred embodiment of the parachute of this invention as it appears in the inflated condition when in use for retarding the descent of a load. The parachute includes a canopy 10 having a crown portion 12 and skirt portions 14. The apex of the crown portion 12 is symbolically indicated at 16 by conventional crossed center lines. The skirt portions 14 of the canopy are terminated at a hem 18. Shroud lines are provided to connect from the hem 18 to the parachute load 20. These shroud lines may preferably include rat lines 22 which interconnect spaced points on the hem 18, and auxiliary rat lines 24 which interconnect between the members of adjacent paired rat lines 22. Main shroud lines 26 are then connected to each of the rat lines 24 and through a ring 28 to support the load 20.

The advantage of the system of rat lines 22 and 24 is to make it possible to use a small total number of main shroud lines 26, while at the same time distributing the load which is applied to the canopy to a number of points along the hem 18 for each of the main shroud lines 26. It is apparent that this system of shroud lines could be extended to further reduce the number of main shroud lines 26 by introducing another set of rat lines between adjacent rat lines 24 to which the main shroud lines 26 could be attached. This system of distributing the load at the hem of the parachute canopy is particularly valuable for a hem-rigged parachute such as the parachute of the present invention in which the shroud lines do not pass over the top of the canopy. The total effective shroud line length, that is the distance from the hem 18 to the ring 28 when the shroud lines are extended as shown in FIG. 1 should be preferably in the order of one and one half to one and three quarters times the developed hemispherical diameter of the spherical sector formed by the inflated canopy 10.

The rat lines 22 are preferably connected to the hem 18 by means of a hem cord which is enclosed within the hem and forms a part of the hem. This structure, including a hem cord 30, is shown in more detail and will be described in connection with FIGS. 2, 3, and 4. Other details of construction of this shroud line suspension structure are preferably carried out in accordance with the teachings of U.S. Patent 2,634,068 issued April 7, 1953, for "Parachute Shroud Line Suspension Structure" and on which the present inventor is a co-inventor with Mr. Walter S. Finken. The various embodiments of the shroud line structures of that patent are applicable to the parachute in accordance with the present invention. Shroud line arrangements may also be employed such as shown in U.S. Patent 2,365,184 issued December 19, 1944, for a "Parachute" on which the present inventor is a co-inventor with Mr. Walter S. Finken. Preferably the hem cord 30, or the combination of the shroud lines, including rat lines, together with the hem cord structure, is operable to constrict or gather the skirt portions 14 of the canopy 10 at the hem 18. In particular, the hem cord 30 preferably has a limited unstressed circumference so as to achieve this constriction.

The canopy 10 is preferably composed of two sets of uniformly spaced fabric ribbons 32 and 34, the members of each set of ribbons being mutually parallel in the crown portion 12 of the canopy 10. The members of each set of ribbons are arranged at an angle which is preferably a minimum of at least forty five degrees to the members of the other set, but the minimum angle may vary up to ninety degrees. The spacing between adjacent ribbons within each set is sufficient in the crown portion 12 of the canopy to provide vent openings therebetween. The aggregate area of these openings in the crown portion of the canopy is preferably in the order of 25% of the total area of the crown portion. This percentage of vent area may vary in the range usually from 8% to about 30% depending upon the operating conditions to which the parachute is to be subjected. In some instances, however, the total vent area may approach 50% of the total. This high vent ratio is useful for example for very high altitude work.

Figure 2:
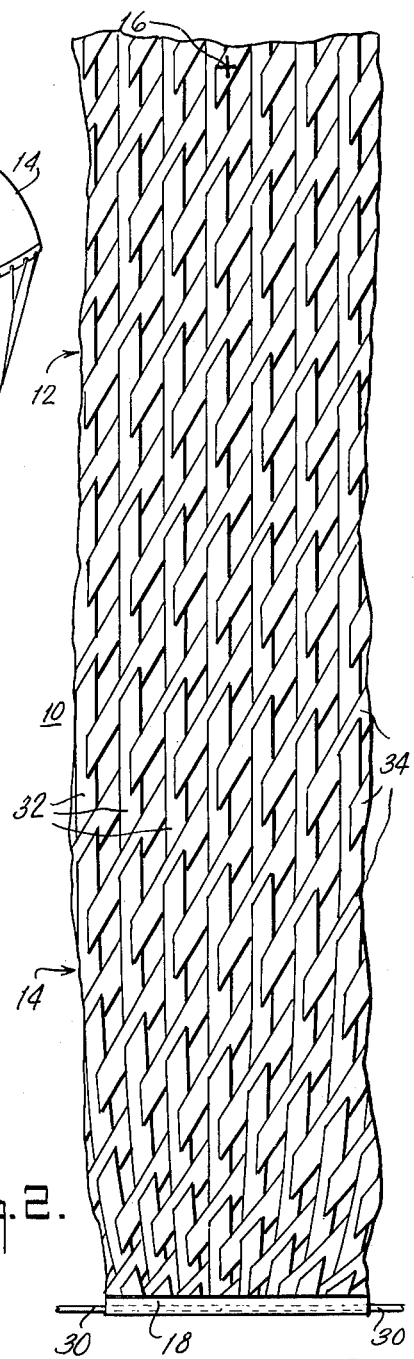
FIGURE 2 is an enlarged detail view of a portion of the canopy of the parachute embodiment shown in FIG. 1 which particularly illustrates the convergence of the ribbons in the skirt portions of the canopy.

The members of each set of ribbons converge to a closer spacing with a correspondingly reduced aggregate vent area in the skirt portions 14 of the canopy. The convergence of the ribbons in the skirt portions 14 may be said to result from the inflated shape which the parachute canopy assumes. This generally spherical inflated shape may be achieved either by fabricating the canopy and attaching the ribbons to one another over a spherical form, or the shape may be achieved by forming the parachute canopy as a flat structure and by relying upon the gathering and constricting operation of the hem cord 30 and the associated shroud structure to impart the shape on inflation. In either case, the skirt portions 14 are constricted and gathered together, and thus the vent areas are reduced within the skirt portions 14. However, the ribbons are generally spaced apart, even at the hem FIGURE 2 is an enlarged detail of a portion of the canopy 10 which illustrates how the ribbons may be joined, and which particularly demonstrates how the ribbons converge in the skirt portion of the canopy. Furthermore, FIGURE 2 illustrates that the two sets of ribbons need not be at 90 degrees to one another, even in the crown portion of the canopy, but as mentioned above, they may have a minimum angle of intersection in the order of 45 degrees. As shown in FIGURE 1, and more clearly in FIGURE 2, the ribbons may be joined to one another at their intersections by having one ribbon pass through a slot in the intersecting ribbon.

FIGURE 3 is a further enlargement of only a small section of the skirt portion 14 of the canopy 10 which more clearly illustrates a method of attachment between intersecting ribbons. As shown in FIGURE 3, for instance, at 36 and 38, each ribbon is provided with a longitudinal slot at every other intersection with members of the other set of ribbons. The intersecting ribbons of the other set are threaded through the slots. At the intersections between its own slots, each ribbon passes through a slot in the intersecting member of the other set. Thus, each ribbon is joined to every intersecting ribbon of the other set either by threading through a slot in the other ribbon, or by having the other ribbon threaded through one its slots. The slots are preferably formed by a method which will prevent unraveling and fraying of the ribbon fabric at the slot edges. If the ribbons are made of nylon or one of the other materials which melts or softens with heat, then a preferred method for forming the slots is by means of a heated shear which not only severs the threads to form the slot opening, but causes the individual threads at the slot opening to be momentarily melted or at least softened to a point where they adhere to adjacent threads to form a bonded edge. Thus, individual threads are held to one another and cannot unravel or fray. The slots may also be formed in the ribbons by an operation which may be more accurately described as punching with a hot punching bar. In this instance, a small amount of material is removed from the center of the slot and the ends of the slot are slightly rounded with individual threads bonded together so as to prevent shearing and elongation of the slot.

The hem 18 is preferably constructed so as to incorporate reenforcement tapes including an inner ply 42 and an outer ply 44, both of which surround and contain the hem cord 30 and both of which are stitched together to the ribbons by stitching as indicated at 46. In order to obtain a completely safe and secure attachment of each ribbon to the hem 18, each ribbon is fastened by the stitching 46 at least twice. This is accomplished by causing each ribbon to pass down between the inner ply 42 and the outer ply 44, under the hem cord, and up on the other side, so that each individual ribbon is stitched to the hem both at its entering side and its emerging side. The emerging end of the ribbon, as indicated at 48, may then be trimmed off. The connection of the ribbons to the hem may be further reenforced by sewing the end of the ribbon emerging from the hem to another entering ribbon, such as indicated for instance, by the stitching at 50, which fastens the emerging end 52 of the ribbon 54.

Openings, as indicated at 56, are provided in both plys 42 and 44 of the hem 18 in order to expose the hem cord 30. These openings are preferably evenly spaced around the hem 18 and they provide points for fastening the shroud rat lines 22. These points of attachment are preferably fairly closely spaced in order to apply the load at the hem as evenly as possible to each of the individual ribbons. Thus, the spacing of the points of attachment may be approximately equal to two times the spacing between center lines of adjacent ribbons in one set of ribbons where they meet the hem 18. This spacing varies depending upon the angle at which the ribbons meet the hem, but a good practical spacing is in the order of one foot between attachment points at openings 56, and the spacing may be increased to fifteen inches or more, depending on the over all size of the parachute structure and the width and spacings of the individual ribbons in the canopy. The above dimensions are workable for instance, with two inch ribbons spaced on four inch centers. Preferably the points of attachment at openings 56 do not coincide with the center line of any one of the ribbons where the ribbons are attached to the hem. Instead, these points of attachment should be spaced to be approximately midway between the center lines of the ribbons as they meet the hem. It is most important that this spacing relationship be followed with respect to the set of ribbons the members of which are most nearly perpendicular to the hem where they meet the hem. This is true because the ribbons which are most nearly perpendicular to the hem are the ribbons which are most highly stressed in tension. It is preferred that the stress be distributed from the hem to the ribbons, rather than being concentrated upon individual ribbons, as it would be if the points of attachment coincided with the center lines.

If desired, the intersecting ribbons of the canopy in the embodiments shown in FIGS. 1, 2, and 3 may be additionally attached together by stitching. However, the threaded slot connections are often sufficient without such stitching, and the parachutes may be packed in a smaller space if the stitching is omitted. If stitching is used, it may conveniently take the form of a continuous line of stitching near each edge of each ribbon. This form of stitching is very easily applied and has been found to be very satisfactory because it prevents separation of the surfaces of the intersecting ribbons at the intersection. The ribbons of the canopy of the parachute of the present invention may also be joined by other methods such as that illustrated in FIGURE 4, for instance.

FIGURE 4 illustrates an alternative method of joining the ribbons in forming the canopy of a parachute in accordance with the present invention. In the structure of FIGURE 4, the ribbons are simply woven together in a common basket weave pattern and then they are preferably joined together at each intersection by any suitable method such as by stitching or by the employment of an adhesive, or by any other known method. In all other respects, the structure illustrated in FIGURE 4 is similar to that illustrated in FIGURE 3 and similar reference numerals are applied to the corresponding parts. Various other alternative methods for mutual attachment of the ribbons at their intersections may be employed such as those illustrated for webs of cargo nets in U.S. Patent 3,011,820 for instance, but they are not illustrated here for purposes of brevity.

As illustrated in FIG. 1, the edge of canopy 10 at the hem 18 appears to have a circular shape. However, for ease of manufacture, it is preferred that this edge be formed as a series of straight edges, thus, the outline of the periphery of the canopy may be a square or other regular polygon.

As mentioned above, it is possible to carry out the present invention by forming the ribbon canopy in accordance with the present invention as a flat structure so that it is not rounded, but flat, in its unstressed condition. This is regarded as an advantage because formation of the structure in the flat is somewhat simpler and more economical than formation in a spherical or mushroom shape. However, the canopy of the present invention is preferably preformed into a curved structure which may have the shape of a section of a sphere or which may have a slightly greater curvature in the skirt portions so as to be more accurately described as having a mushroom shape. When the canopy is preformed into such a curved shape, this is most expeditiously accomplished by laying the ribbons down over a curved form which has the desired degree of curvature. The present invention encompasses a method for producing such a preformed canopy. Several of the steps in a preferred form of the method for producing such a preformed parachute canopy in accordance with the present invention are illustrated in FIGURES 5a and 5b.

FIGURES 5a and 5b illustrate two steps of a preferred method of constructing a ribbon parachute canopy in accordance with the present invention, and which is formed in a compound curve and has a generally hemispherical shape. First, as shown in FIGURE 5a, the two sets of ribbons 32 and 34 are assembled together in the flat as shown. While FIGURE 5a illustrates the basket weave type of pattern, which is also shown in FIGURE 4, it will be understood that this step of the method as illustrated in FIGURE 5a may be practiced also with the cross-slotted form of the invention as previously illustrated in FIGURES 1, 2 and 3. The flat assembly of ribbons shown in FIGURE 5a is preferably fastened together by loose stitching (which is usually referred to as basting) longitudinally along a central ribbon of each of the sets of ribbons as generally indicated at 60 and 62. Preferably this assembly of ribbons is also held together by tack stitching along each of the four ribbons nearest the edges of the assembly, as generally indicated at 64, 66, 68 and 70.

The assembly is then placed over a generally hemispherical form 72, as shown in FIGURE 5b. After placing the assembly over the form 72, the positions of the individual ribbons are adjusted upon the form so as to cause the assembly to assume the shape of the form. Either before or after the ribbons are adjusted in this manner, they are preferably fastened temporarily in place near the lower periphery of the form by means such as a ribbon of self-adhesive paper tape as indicated at 74. Various types of commonly available self-adhesive paper tape or cloth tape may be employed for this purpose, other fastening means without the adhesive feature may be employed if desired. However, the most useful practical fastening which has been found is the commonly available self-adhesive paper tape which is referred to as masking tape.

After the circumferential fastening 74 is in place, and the individual ribbon positions have been adjusted so as to cause the assembly to conform to the shape of the form 72, then the edges of the assembly below the circumferential fastening 74 are formed into a hem and provided with a hem cord in accordance with the features of construction illustrated in FIGURE 4. As mentioned previously in connection with that figure, the hem cord is enclosed within an inner ply 42, the ribbons which meet the hem are doubled around the inner ply 42 and then the outer ply 44 is added as the outer portion of the hem structure and the two plys and the ribbons are stitched together. Preferably, each ribbon is joined at every intersection with another ribbon by sewing it to the intersecting ribbon, or by employing another conventional fastening means as previously mentioned above. However, if the cross-slotted structure as illustrated in FIGURES 1, 2 and 3 is employed the step of sewing or other fastening at the intersections is optional.

The above described method is very convenient because the steps illustrated in FIGURE 5a, which involve the basic assembly of the parts of the structure of the canopy, are all easily performed in the flat, while a minimum of workmen's time is required for carrying out the steps illustrated in FIGURE 5b where the curved shape is imparted to the canopy, and the steps which follow.

When the above method of construction is employed, the individual ribbons which form the members of the parallel set 32 or 34 are placed upon the form 72 in such a manner as to be substantially parallel in the crown portion of the canopy, and these ribbons will then necessarily converge to a certain degree as they enter the skirt portion 14 and approach the hem 18. Because each ribbon is positioned around the form 72 so as to be substantially equally stressed, the center lines of adjacent ribbons will come closer together in the hem region, and thus the ribbons themselves may be said to converge. Therefore, the aggregate vent area in the crown portion of the canopy is at a maximum, and rapidly decreases from this value in the skirt portions of the canopy. As previously mentioned above, the same result is achieved if the ribbon canopy of the present invention is formed completely in the flat because of the gathering and constricting action provided by the hem cord and its associated shroud lines.

In some instances, the reduction in the aggregate vent area in the skirt portions of the canopy achieved by the convergence of the ribbons in those portions may be insufficient for the achievement of the desired aerodynamic characteristics. In such instances, the aggregate venting in the skirt portions may be reduced further by employing wider ribbons in the skirt portions only. It is to be observed from an inspection of FIG. 1 that in the structures of the present invention, some of the ribbons are almost parallel to the hem of the canopy and never traverse the crown portion 12 of the canopy, but remain in the skirt portion only. These ribbons may be made slightly wider than the others, with the same center to center ribbon spacing, so as to reduce the vent area in the skirt portions 14. Another method which is equally effective is to employ ribbons having the same width but to assemble them with closer center to center spacing to reduce the aggregate vent area in the skirt portions 14.

For some purposes it is desirable to change the areodynamic characteristics of the parachute canopy of the present invention by reducing the aggregate vent area of the canopy, particularly in the immediate region of the apex of the canopy. FIGURE 6 illustrates a modification of the structure of the present invention which accomplishes this.

FIGURE 6 is a side view through a central section of a modified embodiment of the parachute of the present invention which incorporates a solid panel 76 in the center of the crown portion thereof. The panel 76 is preferably a circular panel of solid fabric material which is fastened by a suitable stitching 78 at its edge portions to the remainder of the canopy. The panel 76 is preferably composed of a conventional parachute fabric without vents. The stitching 78 is preferably a loose form of stitching, such as a "chain" stitch, so that the stiching itself does not restrain any movement or stretching of the portions of the canopy to which the stitching is fastened in a direction tangential to the circle of stitches. Preferably the fabric panel 76 is attached to the underside of the ribbon structure of the canopy so that the ribbons which cross above the panel serve to reinforce the panel. The portion of the canopy which is closed up by the panel 76 preferably does not exceed about 10 percent of the total area of the canopy, depending upon the total size of the canopy and other design considerations and requirements. The proportion of the total area of the canopy closed by the panel 76 may be reduced to almost any value below ten percent.

Another alternative structure shown in FIG. 7 which may be employed for reducing the aggregate vent area in the apex region of the crown portion of the canopy is by inserting and sewing in additional ribbons 80. By this method a similar area in the vicinity of the apex of the crown portion of the canopy may be closed off or substantially closed off by no more than one additional set of parallel ribbons. These additional ribbons may be added intermediate to and parallel to one of the existing sets of ribbons.

The patterns formed by the two crossed sets of ribbons in the parachute canopy structures employed in this invention may be variously described as "criss-crossed," or as a "grid" pattern.

The ribbons employed in the construction of parachute canopies in accordance with the present invention may be made of any of the materials commonly used in parachutes. However, ribbons formed from nylon textile material are preferred because of the various advantages afforded by nylon including high strength, economy, resistance to deterioration, and consistency of results. The nylon threads themselves may be formed from any of the compounds which are commonly identified as nylon such as polyhexamythelene adipimide, polyhexamythelene sebacimide, or polycaprolactam. The ribbons used in this invention may be sometimes referred to by various other terms such as webbings, straps, tapes, strips, bands, or narrow fabric. However, the term "ribbon" is believed to most accurately describe the material which is actually preferred for forming the canopies of the parachute of the present invention. The ribbon is preferably a narrow, single ply fabric of light weight which has selvage edges. In practical embodiments of the invention, ribbon widths in the order of one to two inches have been employed, however, the ribbon width is not believed to be critical.

A specific ribbon material which is preferred for carrying out the present invention is two inches wide and has the following specification:

It is formed from a bright, high tenacity polyhexamethalyne adipamide having a melting point of 482° plus or minus 10° F. The warp and filling yarn employed has ten turns plus or minus one turn of Z twist per inch. The weave of the body of the ribbon is a conventional two-up and two-down right hand twill and the selvage weave is a double plain weave of a conventional hatband type. The acidity condition of the material of the finished ribbon is such that it is between 5.0 and 9.0 in pH value. The ribbon has the natural nylon color. The minimum weight may be expressed as 100 yards of length to the pound. The minimum breaking strength when subjected to longitudinal stress is 300 pounds. The minimum filling picks per inch is 80. The minimum elongation is 22%. The air permeability is 150 cubic feet per minute per square foot of area with a tolerance of plus or minus thirty cubic feet. The denier of the yarn is forty for both the warp and the filling. In general, these ribbon materials should comply with United States Government military specifications for ribbons and tape textile materials which are intended for the fabrication of parachute canopies.

While certain variations and modifications of the present invention will occur to those who are skilled in the art, it is intended that the following claims shall cover the entire valid scope of this invention and to include such variations and modifications.

I claim:

1. A parachute comprising a canopy including at least two sets of fabric ribbons, the members of each set being mutually parallel in the crown portion of said canopy, each set being arranged at a minimum angle of at least forty five degress to the other set, each of said ribbons being longitudinally slotted at every second crossing with the members of the other set, each ribbon being connected to the members of the other set by having the members of the other set at every second crossing threaded through the slots thereof, and by being threaded through the slots in every intermediate member of the other set, said canopy being terminated at its edges by a hem member, a floating hem cord enclosed within said hem member and operable to constrict the skirt portions of said canopy, said hem member including openings therein, and shroud members connected to said hem cord at said openings.

2. A parachute having a canopy with a substantially closed crown portion, the stressed structure of said canopy consisting essentially of two sets of uniformly spaced fabric ribbons, the members of each set being mutually parallel in the crown portion of said canopy and the members of each set being arranged at an angle of at least forty-five degrees to the members of the other set and the spacing between adjacent ribbons being sufficient in the crown portion of said canopy to provide a plurality of uniformly distributed vent openings, the members of each set of said ribbons converging to a closer spacing in the skirt portions of said canopy, the skirt portions of said canopy being terminated by a hem, a floating hem cord positioned within the hem, said hem including spaced openings therein to expose said hem cord, shroud lines connected to said hem at said openings, said shroud lines being connected and arranged to support the parachute load, and said hem cord being operable during use of the parachute to constrict and gather the skirt portions of said canopy.

3. A ribbon parachute having a canopy with a uniformly vented crown portion, the stressed structure of said canopy consisting essentially of two sets of uniformly spaced fabric ribbons, the members of each set being mutually parallel and substantially perpendicular to the members of the other set, the spacing between adjacent ribbons being sufficient in the crown portion of said canopy to provide a plurality of distributed vent openings, the members of each set of said ribbons converging to a closer spacing in the skirt portions of said canopy, the skirt portions of said canopy being terminated by a hem, and shroud lines connected to said hem and connected and arranged to support the parachute load.

4. A parachute having a canopy with a substantially closed crown portion, said canopy consisting essentially of two sets of uniformly spaced nylon fabric ribbons, the members of each set being mutually parallel in the crown portion of said canopy and the members of each set being arranged at an angle of at least forty five degrees to the members of the other set, the spacing between adjacent ribbons being sufficient in the crown portion of said canopy to provide a plurality of distributed vent openings, the aggregate area of said openings in the crown portion of said canopy being in the order of twenty five percent of the total area of said crown portion, the members of each set of said ribbons converging to a closer spacing with a correspondingly reduced aggregate vent area in the skirt portions of said canopy, the skirt portions of said canopy being terminated by a hem, at least one floating hem cord positioned within said hem and having a limited unstressed circumference and operable to constrict the hem of said canopy, said hem including spaced openings therein to expose said hem cord, and shroud lines connected to said hem cord at said openings, said shroud lines being connected and arranged to support the parachute load.

5. A parachute in accordance with claim 4 in which the vents in the apex of the canopy are closed by the insertion of additional fabric material.

6. A parachute as set forth in claim 5 in which said added fabric material in the apex portion is in the form of a generally circular panel of cloth which is positioned on the under side of said ribbon canopy and sewn at its edges to the ribbons in the crown portion of said canopy.

7. A parachute as set forth in claim 5 in which said additional material closing off said apex vents is in the form of ribbons which are fastened in parallel to one of said aforementioned sets of ribbons and spaced intermediate thereto and across said vent openings.

8. A ribbon parachute having a canopy consisting of two sets of uniformly spaced crossed fabric ribbons forming a grid pattern with uniform vent openings in the crown portion thereof, the members of each set of said ribbons converging to a closer spacing in the skirt portions of said canopy to provide vent openings of graded reduced size in said skirt portions.

9. A ribbon parachute having a canopy with a uniformly vented crown portion, said canopy consisting of two sets of uniformly spaced nylon fabric ribbons, the members of each set being mutually parallel in the crown portion of said canopy and the members of each set being arranged at an angle of at least forty-five degrees to the other set, each of said ribbons being longitudinally slotted at every second crossing with the members of the other set, each ribbon being connected to the members of the other set by having members of the other set at every second crossing threaded through the slots thereof, and by being threaded through the slots in every intermediate member of the other set, the spacing between adjacent ribbons being sufficient in the crown portion of said canopy to provide a plurality of distributed vent openings, the aggregate area of said openings in the crown portion of said canopy being in the order of twenty five percent of the total area of said crown portion, the skirt portions of said canopy being terminated by a hem, said hem including inner and outer ply reenforcement tapes, at least one floating hem cord positioned within said hem and having a limited unstressed circumference and operable to constrict the hem of said canopy, said hem including spaced openings in the outer portions thereof to expose said hem cord, and shroud lines connected to said hem cord at said openings, said shroud lines being connected and arranged to support the parachute load.

10. A method of constructing a ribbon parachute canopy comprising the steps of assembling ribbons in the flat in a criss-crossed pattern of at least two sets of parallel ribbons, fastening said assembly of ribbons together by basting longitudinally along a central ribbon of each of said sets of ribbons, placing the assembly over a form having the shape to be imparted to the canopy, temporarily fastening the individual ribbons of said assembly upon said form near the circumference thereof and adjusting the positions of the individual ribbons upon said form so as to shape the assembly thereon, forming the portions of the assembly below the circumferential fastening into a hem and enclosing a hem cord therein, and then removing said assembly from said form.

11. A method of constructing a ribbon parachute canopy comprising the steps of assembling ribbons in the flat in a criss-crossed pattern of two sets of parallel ribbons, fastening said assembly of ribbons together by basting longitudinally along a central ribbon of each of said sets of ribbons to thereby fasten each of said ribbons to one of said central ribbons, tack-stitching along each of the four ribbons nearest the edges of said assembly to fasten each of the ribbons to an edge ribbon where it intersects with an edge ribbon, placing said assembly over a generally hemispherical form having the shape to be imparted to said canopy, adjusting the positions of the individual ribbons upon said form so as to shape said assembly thereon, fastening the individual ribbons of said assembly upon said form by a temporary circumferential fastening at a substantially uniform distance from the crown of said form, forming the portions of said assembly below said circumferential fastening into a hem and enclosing a hem cord therein, stitching said hem, removing said circumferential fastening, and then removing said assembly from said form.

12. In a parachute structure, a canopy comprised of at least two sets of criss-crossed fabric ribbons, the members of each set being mutually parallel and spaced to define openings therebetween in the crown portion of said canopy, and the members of each set converging to a closer spacing in the skirt portions of said canopy.

13. A ribbon parachute comprised of a canopy having vents of graded size between adjacent ribbons, said vents varying from the largest size in the crown portion thereof to smaller sizes in the skirt portions to the smallest size at the hem edge of said skirt portions, said canopy consisting of two sets of nylon ribbons, the members of each set being mutually parallel to the other members of the same set in the crown portion of said canopy and placed at a substantial angle to the members of the other set to establish crossings therebetween, said ribbons being interconnected at each crossing.

14. A parachute having a canopy with a substantially closed crown portion, said canopy consisting of two sets of uniformly spaced single ply nylon fabric ribbons, the members of each set being mutually parallel in the crown portion of said canopy and the members of each set being arranged at a minimum angle of at least forty five degrees to the members of the other set and the spacing between adjacent ribbons being sufficient in the crown portion of said canopy to provide a plurality of uniformly distributed vent openings, the skirt portions of said canopy being terminated by a hem, the ribbons which meet said hem being doubled within said hem structure, a floating hem cord positioned within said hem, and within the doubled ribbons thereof, said hem including spaced openings therein to expose said hem cord, shroud lines connected to said hem cord at said openings, said shroud lines being connected and arranged to support the parachute load, and said hem cord being operable during use of the parachute to constrict and gather the skirt portions of said canopy.

15. A parachute comprising a canopy in which the stressed structure thereof consists essentially of two criss-crossed sets of ribbons, the ribbons of each set being spaced apart throughout their length and substantially parallel to each other in at least the crown portion of the parachute, and additional fabric material in the crown portion of the parachute closing off the openings in the crown portion between the criss-crossed ribbons.

References Cited by the Examiner
UNITED STATES PATENTS

| | | | |
|---|---|---|---|
| 2,402,709 | 6/1946 | Swasey | 28—72 |
| 2,450,926 | 10/1948 | Weinig | 244—145 |
| 2,494,600 | 1/1950 | Weinig | 244—145 |
| 2,500,170 | 3/1950 | Fogal | 244—145 |
| 2,527,553 | 10/1950 | Ingels | 244—145 |
| 2,651,481 | 9/1953 | Steinthal | 244—145 |
| 2,730,316 | 1/1956 | Frieder et al. | 244—145 |
| 3,127,137 | 3/1964 | Downing | 244—145 |
| 3,173,636 | 3/1965 | Sepp | 244—145 |

MILTON BUCHLER, *Primary Examiner.*

FERGUS S. MIDDLETON, *Examiner.*

A. E. CORRIGAN, *Assistant Examiner.*